United States Patent
Maiwald

[19]
[11] Patent Number: 5,829,704
[45] Date of Patent: Nov. 3, 1998

[54] ROTARY DRIVE FOR A BELT TENSIONER

[75] Inventor: Helmut Maiwald, Schechingen, Germany

[73] Assignee: TRW Occupant Restraint Systems GmbH, Alfdorf, Germany

[21] Appl. No.: 926,711

[22] Filed: Sep. 10, 1997

[30] Foreign Application Priority Data

Sep. 24, 1996 [DE] Germany ................. 296 16 624.3

[51] Int. Cl.$^6$ ................................................. B60R 22/46
[52] U.S. Cl. ................................... 242/374; 280/806
[58] Field of Search ..................... 242/374; 280/806

[56] References Cited

U.S. PATENT DOCUMENTS

| | | | |
|---|---|---|---|
| 4,014,479 | 3/1977 | Nilsson et al. | 242/374 |
| 4,455,000 | 6/1984 | Nilsson | 242/374 |
| 4,508,288 | 4/1985 | Nilsson | 280/806 |
| 4,558,832 | 12/1985 | Nilsson | 280/806 |
| 4,597,586 | 7/1986 | Burghardt et al. | 280/806 |
| 5,383,623 | 1/1995 | Hiruta et al. | 242/374 |
| 5,400,983 | 3/1995 | Nishizawa et al. | 242/374 |
| 5,451,008 | 9/1995 | Hamaue | 242/374 |
| 5,505,399 | 4/1996 | Schmid et al. | 242/374 |
| 5,553,803 | 9/1996 | Mitzkus et al. | 242/374 |
| 5,653,398 | 8/1997 | Fohl | 242/374 |
| 5,743,480 | 4/1998 | Kopetzky et al. | 242/374 |

*Primary Examiner*—John P. Darling
*Attorney, Agent, or Firm*—Tarolli, Sundheim, Covell, Tummino & Szabo

[57] ABSTRACT

A rotary drive for a belt tensioner comprises a housing having at least two cylindrical recesses with adjacent wall parts of the housing limiting the recesses. The recesses have at least approximately the form of circle sectors. The rotary drive further comprises a pinion mounted rotatably in the housing, and at least two rotary pistons arranged opposite one another in a respective one of the recesses. The pistons are designed as cylindrical bodies having the form of circle sectors. Each piston extends over a circle arc which is significantly less than the circle arc over which each of the recesses extends, each of the pistons having side faces limiting the circle arc. Each piston is provided with external teeth adapted to engage the pinion. A pressure space is formed between one of the side faces of each of the pistons and the wall parts delimiting the corresponding one of the recesses. The pressure space is adapted to be supplied with a pressurized gas for driving the pistons.

6 Claims, 1 Drawing Sheet

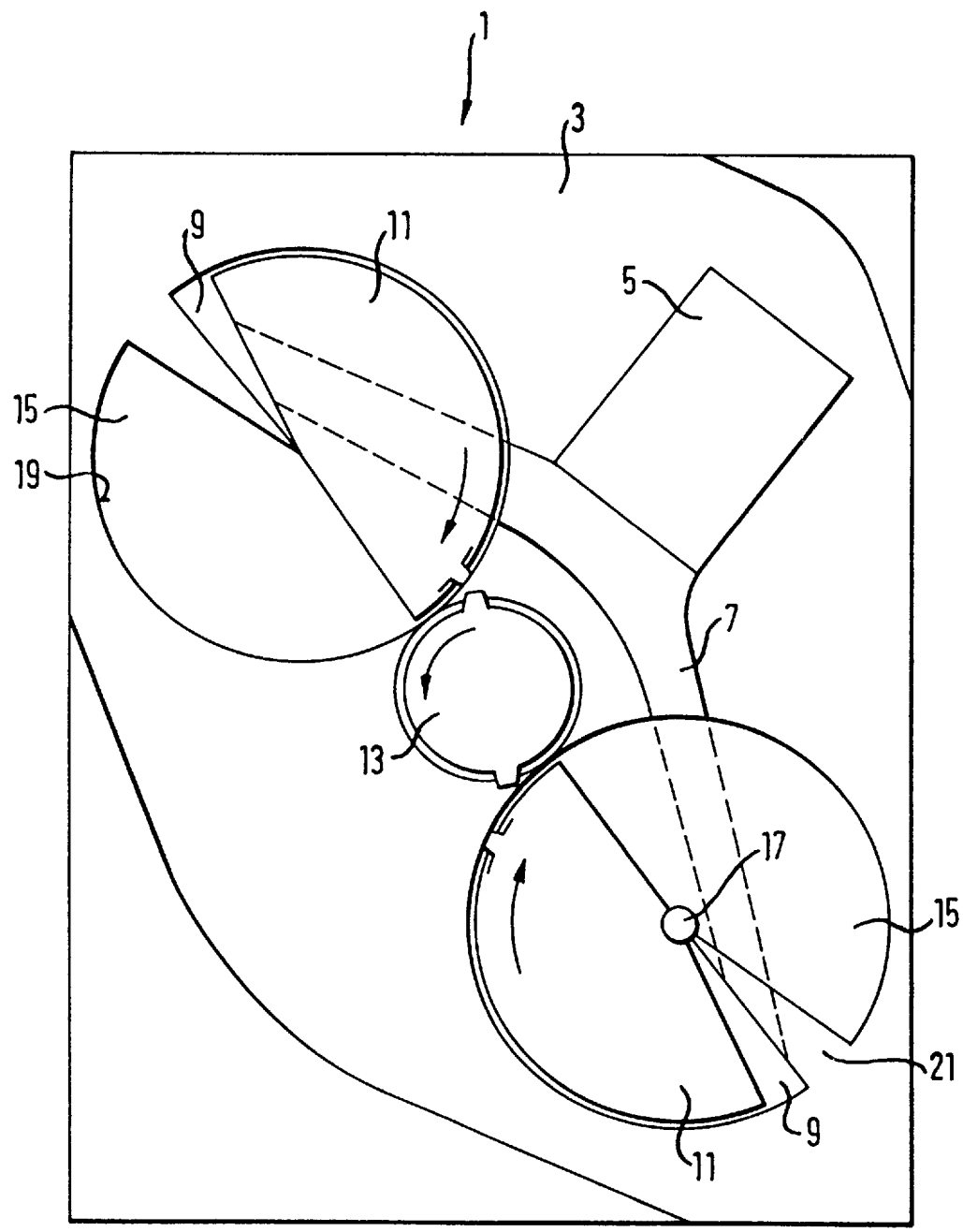

ROTARY DRIVE FOR A BELT TENSIONER

The invention relates to a rotary drive for a belt tensioner.

BACKGROUND OF THE INVENTION

In one type of known belt tensioners, there is provided a housing, a pinion mounted rotatably therein and at least two pistons which are arranged opposite one another in respective housing chambers. The pistons have external teeth which either are in engagement with the pinion or can be moved into engagement with the pinion, and can be driven by means of pressurized gas introduced into the relevant housing chamber.

A rotary drive of this type is known from EP 0,629,531 A1. In this rotary drive, the cylindrically designed pistons are mounted displaceably in mutually opposite guide tubes arranged at right angles to the axis of a pinion. On the side facing the pinion, the pistons have teeth which mesh with external teeth on the pinion when the pistons are displaced out of their position of rest. For this purpose, each piston is assigned its own pyrotechnical charge, which is ignited in the case of restraint. The guide tubes can be rectilinear or curved. When activating the pressure space, it must be ensured that both propellant charges ignite simultaneously since, otherwise, one piston would drive the pinion first and the teeth of the piston driven with a time delay relative thereto would no longer be able to engage in the teeth of the pinion, which is then rotating rapidly.

U.S. Pat. No. 4,558,832 discloses a rotary drive, in the interior of which a pyrotechnical propellant charge is arranged. The pinion is surrounded by an annular cavity which is interrupted by a housing projection which projects as far as the pinion. A rib projecting from the pinion and bridging the cavity, delimits, together with the housing projection, a pressure space into which the gas passes which is generated when the propellant charge is ignited. The pressure forces acting on the rib impart rotation to the pinion, which is subject to load on one side. The known rotary drive is relatively long since the propellant charge in the interior of the pinion requires a large volume.

BRIEF DESCRIPTION OF THE INVENTION

The invention provides a rotary drive which is distinguished by an extremely flat construction and in which the pinion is not subjected to unilateral forces acting upon it laterally. According to the invention, a rotary drive for a belt tensioner comprises a housing having at least two cylindrical recesses which are limited by adjacent wall parts of the housing. The recesses have at least approximately the form of circle sectors. The rotary drive further comprises a pinion mounted rotatably in the housing, and at least two rotary pistons arranged opposite one another in a respective one of the recesses. The pistons are designed as cylindrical bodies having the form of circle sectors. Each piston extends over a circle arc which is significantly less than the circle arc over which each of the recesses extends. Each of the pistons has side faces limiting said circle arc. Each piston is provided with external teeth adapted to engage the pinion. A pressure space is formed between a side face of each of the pistons and wall parts delimiting the corresponding one of the recesses. The pressure space is adapted to be supplied with a pressurized gas for driving the pistons.

In a preferred embodiment, a common pyrotechnical propellant charge is provided for the rotary pistons, the propellant charge being connected to the pressure spaces by branching flow passages. This construction ensures at all times that both pistons are subjected to pressurized gas simultaneously.

It may furthermore be advantageous if the teeth of the pinion and of the pistons are not in engagement with one another in the state of rest since the pinion and the shaft can then rotate freely without the need to provide a clutch between them.

BRIEF DESCRIPTION OF THE DRAWING

Further features and advantages of the invention will emerge from the description which follows of a preferred embodiment and from the drawing, to which reference is made. The drawing shows a cross-section through one embodiment of the rotary drive according to the invention which has two rotary pistons.

DETAILED DESCRIPTION OF THE INVENTION

The rotary drive 1 shown in the drawing has a slim plate-type housing 3 in which a pyrotechnical propellant charge 5 is accommodated. The ignition device for triggering the propellant charge 5 is not shown explicitly. The propellant charge 5 has a flow connection with the pressure spaces 9 of two rotary pistons 11 via a passage 7 which branches into two flow passages. The rotary pistons 11 are situated on opposite sides of a centrically arranged pinion 13. The pinion 13 can be coupled to a shaft of a conventional belt retractor by way of a clutch.

Each rotary piston 11 has the shape of a thin, flat cylindrical body in the form of a circle sector. This circle sector is defined by two radii which intersect at an angle of somewhat less than 180°. Provided on the arcuate outer surface of each rotary piston 11 are teeth which mesh with teeth of the pinion 13. The teeth themselves are merely indicated. Each rotary piston 11 is mounted in a recess 15 in the form of a circle sector which forms a housing chamber. For mounting purposes, it is possible either for use to be made of a journal 17 accommodated in the housing 3, as indicted in the case of the lower rotary piston 11, or for the rotary piston 11 to be supported by means of its toothed outer surface on the inner wall 19 of the recess 15. Each pressure space 9 is formed by wall parts which bound the rotary piston 11 and the recess 15, these parts including a narrow housing section 21 in the form of a circle sector, which projects into the recess 15. The circle sector of the pressure space 9 is bounded by radii which intersect at an angle of about 15°, whereas the radii of the circle sector bounding the recess 15 intercept at an angle of about 350°.

In the position of rest illustrated in the drawing, the teeth of the rotary pistons 11 and of the pinion 13 just mesh. The clutch (not shown) between the pinion 13 and the shaft of the belt retractor is not engaged, however, allowing the shaft to rotate freely.

On ignition of the pyrotechnical charge 5, the gas flows via the passages 7 into the pressure spaces 9, with the result that the rotary pistons 11 are rotated simultaneously in the direction of the arrows. The teeth of the rotary pistons 11 are in mesh with those of the pinion 13, with the result that the latter rotates in the direction of the arrow. By automatic engagement of the clutch, the pinion 13 is connected to the shaft and the safety belt connected to the shaft is tensioned. At the end of the tensioning travel, the rotary pistons 11 strike against the housing section 21. Since the forces exerted by the rotary pistons 11 on the pinion 13 are introduced into it at diametrically opposite locations on the pinion 13, no radial forces arise in the mounting of the pinion 13. The transmission ratio between the pistons 11 and the pinion 13 can be determined directly by means of the ratio of the pitch circles of the teeth. Idler gears are not required.

The rotary drive shown is distinguished especially by its small overall size.

I claim:

1. Rotary drive for a belt tensioner, comprising a housing having at least two cylindrical recesses with adjacent wall parts of said housing limiting said recesses, said recesses having at least approximately the form of circle sectors, a pinion mounted rotatably in said housing, and at least two rotary pistons arranged opposite one another in a respective one of said recesses, said pistons being designed as cylindrical bodies having the form of circle sectors, each piston extending over a circle arc which is significantly less than the circle arc over which each of said recesses extends, each of said pistons having side faces limiting said circle arc, each piston being provided with external teeth adapted to engage said pinion, a pressure space being formed between one of said side faces of each of said pistons and said wall parts delimiting the corresponding one of said recesses, and said pressure space being adapted to be supplied with a pressurized gas for driving said pistons.

2. The rotary drive of claim 1, wherein said rotary pistons are formed as thin flat plates in the shape of a circle sector extending over an angle of somewhat less than 180°.

3. The rotary drive of claim 2, wherein said recesses having the form of circle sectors extend over an angle of somewhat less than 360°.

4. The rotary drive of claim 1, wherein a common pyrotechnical propellant charge for said rotary pistons is provided, said propellant charge being connected to said pressure spaces by branching flow passages.

5. The rotary drive of claim 1, wherein said pinion has external teeth, said external teeth of said pinion being not in engagement with said external teeth of said rotary pistons in a state of rest.

6. The rotary drive of claim 1, wherein each of said pressure spaces is cylindrical and in the form of a circle sector, said circle sector extending over an angle of between about 10° and 20°.

\* \* \* \* \*